April 10, 1951 W. ROTH 2,548,684
APPARATUS FOR SIMULATING THE OPERATION OF
A RADIO OBJECT LOCATING SYSTEM
Filed April 30, 1946

INVENTOR
WILFRED ROTH
BY
*William D. Hall.*
ATTORNEY

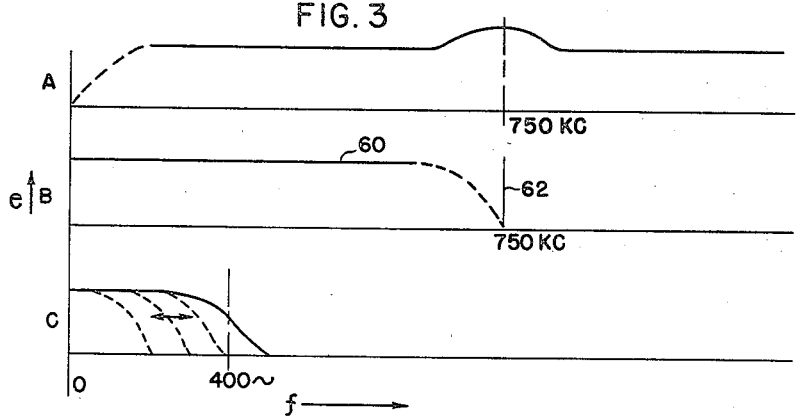
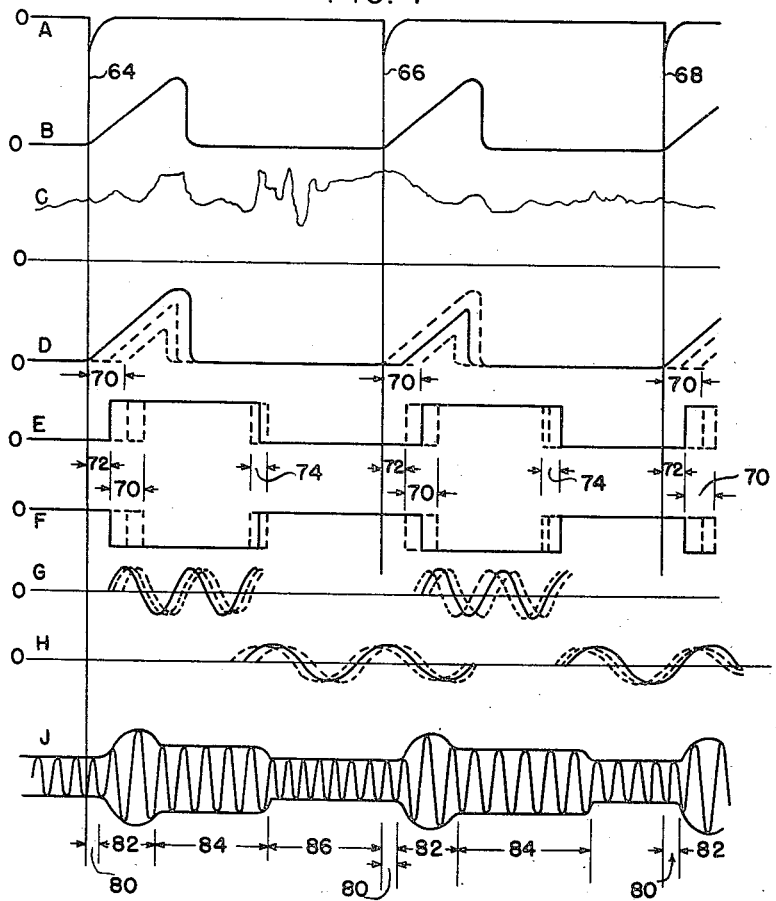

Patented Apr. 10, 1951

2,548,684

UNITED STATES PATENT OFFICE 2,548,684

APPARATUS FOR SIMULATING THE OPERATION OF A RADIO OBJECT LOCATING SYSTEM

Wilfred Roth, Cambridge, Mass., assignor, by mesne assignments, to the United States of America as represented by the Secretary of War Application April 30, 1946, Serial No. 666,021

3 Claims. (Cl. 250—36)

This invention relates to electrical apparatus and more particularly to electrical apparatus for simulating the operation of a radio object locating system under actual operating conditions.

In order to train operators in the proper operation of radio object locating systems it is necessary or at least highly desirable that each operator spend considerable time in operating the radio object locating system under actual operating conditions. It is often impossible due to limited space or limited equipment to so train the operators, therefore, training devices that accurately simulate actual operating conditions are employed in certain phases of training and where it is desirable that the student operators work under close supervision.

It is an object of this invention to provide a novel device for simulating the operation of a radio object locating system.

It is a further object of this invention to provide an attachment for a radio object locating system trainer that will simulate the operation of a radio object locating system located in an aircraft in flight.

In brief, the invention comprises means for simulating in the receiver of a radio object locating system the amplitude modulation of received signals normally present in airborne radio object locating systems. A provision is also made for varying this modulation so that the effect of rotating the system antenna can also be simulated.

For a better understanding of the invention together with other and further objects thereof reference is had to the following description to be read in connection with the accompanying drawings in which:

Fig. 3 is a series of voltage waveforms taken at selected points in the circuit of Fig. 1; and Fig. 4 is a second series of waveforms taken at other selected points in the circuit of Fig. 1.

Figure 1:
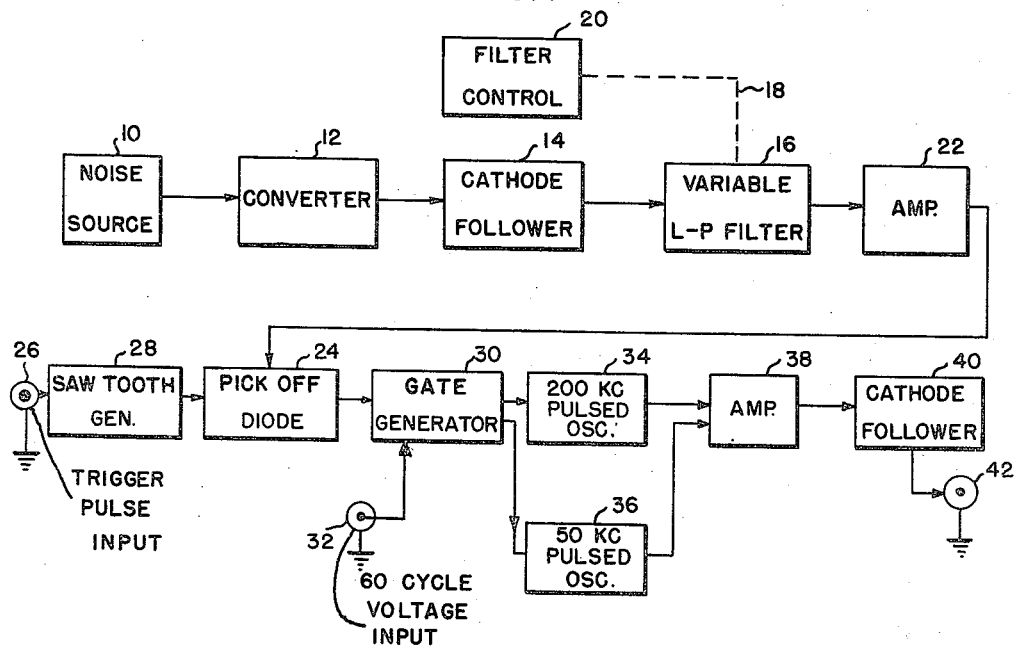
Fig. 1 is a schematic diagram in block form of the preferred embodiment of the invention.

In Fig. 1 of the drawings a noise source 10 is electrically connected to an electronic converter 12. Noise source 10 may be any source of random noise having a relatively uniform noise spectrum over at least a one kilocycle frequency band. A 6D4 gas thyratron tube has been found to be an efficient noise source and the use of this tube is suggested as a possible noise source for this invention. Converter 12 is similar to the conventional converter employed in any superheterodyne radio system, and, in this embodiment of this invention, converter 12 is employed to beat with a selected noise band from noise source 10 to provide a noise spectrum in a frequency band extending from zero frequency to a frequency of approximately 1 kilocycle per second. The converter 12 may be of the type shown on page 54 of War Department Technical Manual TM 11–467.

The output of converter 12 is connected through a cathode follower amplifier 14, such as shown on page 55 of Technical Manual TM 11–467, to a variable low pass filter 16. A mechanical connection denoted in Fig. 1 by a dotted line 18 is made between filter 16 and a filter control unit 20. Filter control unit 20 may be the antenna positioning control of the radio object locating system or trainer or it may be any similar device. Filter 16 is a low pass filter of the type in which the upper cutoff frequency may be varied by means of the mechanical shaft rotation provided by connection 18. If it is not convenient to provide mechanical connection 18, an electrical signal conveying the same intelligence may be substituted therefor and filter 16 modified to respond to this electrical signal. The signal from filter 16 is applied through an amplifier 22 to the cathode of a pick-off diode 24. The amplifier 22 may be of any well known type, one example of which is shown on page 111 of War Department Technical Manual TM 11–466.

Synchronizing pulses from a trigger pulse source 26 are applied to initiate at selected times the operation of a sawtooth voltage generator 28 which may be of the type shown on page 191 of Technical Manual TM 11–466. The output of generator 28 is connected to the anode of diode 24. A signal from diode 24 is applied to a gate generator 30. A second signal is applied to gate generator 30 through an input connection 32. The pick-off diode 24 is a simple diode circuit commonly used for the comparison of two voltages. The sawtooth voltage from sawtooth voltage generator 28 is impressed on the anode of diode 24, while the random noise voltages from amplifier 22 are impressed on the cathode of diode 24, so that the diode starts to conduct and develops an output pulse when the value of the sawtooth voltage exceeds the noise voltage on the cathode of diode 24. The gate generator 30 may be a circuit of the type shown on page 194 of Technical Manual TM 11–466.

Gate generator 30 is electrically connected to and supplies a control signal to pulse oscillators 34 and 36. Oscillator 34 operates at a relatively high frequency; for example, 200 kilocycles per second and oscillator 36 operates at a lower frequency; for example, 50 kilocycles per second. The outputs of oscillators 34 and 36 are combined in an amplifier 38 and this combined signal is applied through a cathode follower 40 to an output signal connection 42. Oscillators 34 and 36 may be of any well known type. One example of a suitable oscillator is shown on page 213 of Technical Manual TM 11–466.

Figure 2:
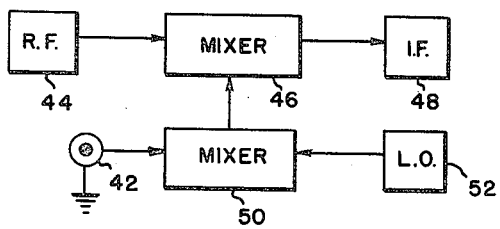
Fig. 2 is a block diagram illustrating one method of connecting this invention to the receiver channel of a radio object locating system.

In Fig. 2 the connection of the circuit shown in Fig. 1 to the receiver channel of a radio object locating system is shown in block form. In this figure, connection 42 corresponds to the connection 42 in Fig. 1 and therefore represents the output of the circuit of Fig. 1. Radio frequency unit 44, mixer 46 and intermediate frequency unit 48 are the conventional units in the system receiver. A mixer 50 is interposed between the system local oscillator 52 and the mixer 46. A second input to mixer 50 is obtained from connection 42. Phase modulation of the signal from the connection 42 will result in amplitude modulation of the signals in intermediate frequency unit 48. The circuit shown in Fig. 2 illustrates one method of connecting the present invention to a radio object locating system. Other methods of connection will be obvious to those skilled in the art, therefore, it is not intended that the present invention be limited in any manner by the circuit shown in Fig. 2. Amplifier 29, mixers 46 and 50, local oscillator 52, RF amplifier and source 44, and IF amplifier 48 are the usual radar receiver components, an example of which is shown on page 54 of Technical Manual TM 11–467.

For a complete description of the operation of the present invention reference is made jointly to the circuit diagram shown in Fig. 1 and to the voltage waveforms shown in Figs. 3 and 4 of the drawings. In Fig. 3 there are shown voltage-frequency curves of signals at the output of noise source 10, converter 12 and filter 16. In this figure instantaneous voltage (e) is plotted as the ordinate against frequency (f) as abscissa. Fig. 3A shows a typical noise output characteristic for a 6D4 tube. In converter 12 the noise signals illustrated in Fig. 3A are mixed with a signal having a frequency of approximately 750 kilocycles per second to obtain the noise spectrum shown in Fig. 3B. Curve 60, Fig. 3B, illustrates the noise spectrum in the output of converter 12. The frequency of the local oscillator is shown as frequency 62 in Fig. 3B. It can be seen from Fig. 3 that the output of converter 12 is a fairly uniform noise spectrum that extends from zero frequency to a frequency of several kilocycles per second. The signal 60 in Fig. 3B is applied to filter 16 which limits the upper frequency to some value usually in the audio range. In the example shown in Fig. 3C the upper limit of frequency passed by filter 16 is approximately 400 cycles per second. The cutoff frequency of filter 16 as a function of angle of shaft 18 varies from the 400 cycles per second maximum through some low value which may be zero and again to the maximum value of 400 cycles per second as shaft 18 is continuously rotated through 180 degrees. The output of filter 16 is applied through amplifier 22 of Fig. 1 to the cathode of pick-off diode 24.

Referring now to Fig. 4 of the drawing there is shown a series of voltage waveforms plotted against a common time base as an abscissa. While the time scale in Fig. 4 is the same for all waveforms the voltage scale may vary from one waveform to the next.

Fig. 4A illustrates the trigger pulses applied to sawtooth generator 28 through input connection 26. The spacing in time between successive voltage pulses in waveform 4A is equal to the spacing in time of successive exploratory pulses in the radio object locating system. For purposes of reference the time of occurrence of three successive trigger pulses are designated by the numerals 64, 66 and 68 respectively. The pulses applied to generator 28 cause this circuit to produce a voltage having a waveform similar to that shown in Fig. 4B. It should be noted that each sawtooth pulse begins at the time of any input trigger; that is, at times 64, 66 and 68. Fig. 4C illustrates the voltage time curves of the output of amplifier 22. This output is the summation of random noise frequencies and hence is irregular in shape. The waveform of Fig. 4C should not be confused with the waveform of Fig. 3A which is a voltage-frequency-curve of the same signal.

The signal illustrated in Fig. 4B is applied to the anode of diode 24 and the signal illustrated in Fig. 4C is applied to the cathode of the same tube. Signals will be applied to generator 30 only when the potential of the anode of diode 24 exceeds the potential on the cathode. The signal applied to generator 30 is illustrated in Fig. 4D of the drawing as a series of sawtooth signals varying in amplitude and in starting time, although the wave shape may vary widely with the type of input circuit employed in generator 30. The initial time of the pulses may vary over the interval represented by intervals 70 in Fig. 4D. The average frequency at which this variation in time position takes place will be equal to the maximum frequency passed by filter 16.

Generator 30 produces two sets of voltage gates occurring at identical times, one set being positive-going gates and the second set being negative-going gates. The start of the voltage gates generated in circuit 30 occur at times after the time of occurrence of the pulses applied to input 26 by an amount equal to a fixed time interval 72 of Figs. 4E and 4F plus the delay in the initial position of the corresponding signals in waveform 4D. Thus the leading edge of the voltage gates in waveforms 4E and 4F may occur after times 64, 66 and 68 by amounts ranging from a time equal to time interval 72 to a time equal to time interval 70 plus time interval 72. In this application it will be assumed that interval 72 is of the order of 12 microseconds. The duration of the gates and waveforms in Fig. 2, 4E and 4F may be any convenient value for example 240 microseconds. The trailing edge of the gates in Fig. 4, 4E and 4F are positioned modulated over a small time interval 74 at a 60 cycle per second rate by the signal applied at connection 32. The gates in waveform 4E control the operation of oscillator 36. Oscillator 36 is made operative at the conclusion of the positive gate and therefore the output of this oscillator is phase modulated at a 60 cycle rate. The start of the next positive gate acts to render oscillator 36 inoperative. However, as shown in Figure 4H, there is a slight delay between the start of the next positive gate and the time oscillator 36 is rendered inoperative. This delay may be any convenient value, for example 50 microseconds. The waveform shown in Fig. 4F controls the operation of oscillator 34. Oscillator 34 is made operative by the leading edge of the gates in Fig. 4F and therefore the output of this oscillator is phase modulated at a frequency determined by the output of filter 16 of Fig. 1. Fig. 4G represents the output signal from oscillator 34 of Fig. 1 and Fig. 4H illustrates the output of oscillator 36 of Fig. 1. The solid line curve in each of these two figures illustrates a possible waveform at any instant while the dotted line curves in these same figures illustrates the limits over which the waveforms shown may vary in successive cycles of the operation of this invention. Fig. 4J illustrates the combined outputs of oscillator 34 and oscillator 36 and therefore is the signal that may be obtained from output connection 42 of Fig. 1. In Fig. 4J the signals occurring in the first interval 80 after times 64, 66 and 68 will be modulated by the 60 cycles signal only. The signal in the intervals 82 will be modulated by random noise signals and 60 cycle signals. The signals in the interval 84 will be modulated by random noise signals in the output of filter 16 and signals in the interval 86 will again be modulated by 60 cycles only. If the signal of Fig. 4J is applied to the receiver of a radio object locating system through a circuit similar to that shown in Fig. 2 the signal appearing in the output of this receiver will be modulated in a manner similar to the manner in which signals are modulated by the movement of the aircraft in flight. One particular feature of this invention is that signals at very short and very long ranges are modulated differently than are the signals at medium ranges and therefore accurately simulate a similar condition occurring in the output of a receiver under actual operating conditions.

The advantages of this invention are thought to be obvious from the above description. The circuit shown in Fig. 1 may be easily connected to the receiver channel of an existing radio object locating system or radio system trainer. The operation of filter control unit 20 will simulate the rotation of the system antenna and oscillators 34 and 36 when controlled by signals received from noise source 10 and input 26 and 32 will provide at output connection 42 a signal which will cause amplitude modulation of the output signals from the system receiver. This amplitude modulation and its variation with the position of filter control unit 20 as before stated will correspond to the amplitude modulation of signals in the output of an airborne receiver when the aircraft is in motion and the antenna is caused to scan.

While there has been described what is at present considered to be the preferred embodiment of this invention, it will be obvious to those skilled in the art that various changes and modifications may be made therein without departing from the scope of the invention.

The invention claimed is:

1. A signal generator comprising a source of random noise signals having a spectrum extending from zero frequency to some preselected minimum value, adjustable filter means, means for connecting the output of said noise source to said filter means, sawtooth generator means, means for initiating the operation of said sawtooth generator means at preselected times, signal combining means for combining the signal from said filter with the signal from said sawtooth generator, said signal combining means thereby providing a signal that is modulated in time with respect to the output signal of said sawtooth generator, gate generator means responsive to the output of said signal combining means, signal input means providing a signal of a predetermined frequency for varying the signal from said gate generator means in a periodic manner, oscillator means responsive to the output of said gate generator means whereby the signal from at least one of said oscillator means is phase modulated by an amount dependent on the signal from said signal combining means and whereby the signal from at least one of said oscillator means is phase modulated by the signal applied at said signal input, amplifier means for combining the outputs of said oscillators, said amplifier having for an output a signal that is phase modulated by said signal from said signal combining means and said signal applied at said signal input, and means for injecting said combined signal into the receiver channel of a radio object locating system receiver whereby the echo signals in the output of said receiver are amplitude modulated in a predetermined manner.

2. A signal generator comprising a source of random noise frequencies extending from zero frequency to a predetermined minimum value, low pass filter means having a variable cut-off frequency, means for connecting the output of said noise source to said filter means, a sawtooth generator means, means for initiating the operation of said sawtooth generator means at preselected times, signal combining means for combining the output of said sawtooth generator means and said filter means, said signal combining means providing an output signal that is time modulated in a random manner at an average frequency that is substantially equal to the cutoff frequency of said filter means, means for generating a signal of a predetermined frequency that is phase modulated in accordance with the time modulation of said signal from said signal combining means, means providing a second signal of a predetermined frequency that is phase modulated at a fixed frequency and means for combining said two phase modulated signals to provide a signal that is phase modulated successively at a fixed frequency and in a random manner at an average frequency substantially equal to the cut-off frequency of said filter.

3. A signal generator comprising a source of random noise frequencies extending from zero frequency to a predetermined minimum value, low pass filter means having a variable cut-off frequency, means for connecting the output of said noise source to said filter means, a sawtooth generator means, means providing signals for initiating the operation of said sawtooth generator means at preselected times, signal combining means for combining the output of said sawtooth generator means and said filter means, said signal combining means providing an output signal that is time modulated in a random manner at an average frequency that is substantially equal to the cut-off frequency of said filter means, means for generating a signal of a predetermined frequency that is phase modulated in accordance with the time modulation of said signal from said signal combining means during a first portion of the time interval between successive initiating signals applied to said sawtooth generator, means providing a second signal of a predetermined frequency that is phase modulated at a fixed frequency at a second portion of the time interval between successive initiating signals applied to said sawtooth generator means, and means for combining said two phase modulated signals whereby said combined signal is successively phase modulated during said time interval between successive initiating signals at a frequency determined by said second phase modulated signal, at a random frequency determined by said first and said second phase modulated signal jointly; at a random frequency determined by said first phase modulated signal, and again at a frequency determined by said second phase modulated signal.

WILFRED ROTH.

REFERENCES CITED

The following references are of record in the file of this patent:

UNITED STATES PATENTS

| Number | Name | Date |
|---|---|---|
| 2,039,405 | Green | May 5, 1936 |
| 2,252,083 | Luck | Aug. 12, 1941 |
| 2,312,962 | DeFlorez | Mar. 2, 1943 |
| 2,326,764 | Crane | Aug. 17, 1943 |
| 2,359,294 | Blenham et al. | Oct. 3, 1944 |
| 2,399,661 | Bowie | May 7, 1946 |
| 2,416,088 | Deerhake | Feb. 18, 1947 |
| 2,438,888 | Andrews | Apr. 6, 1948 |
| 2,444,477 | Stout | July 6, 1948 |
| 2,465,165 | McLaughlin | Mar. 22, 1949 |